Figure 1:
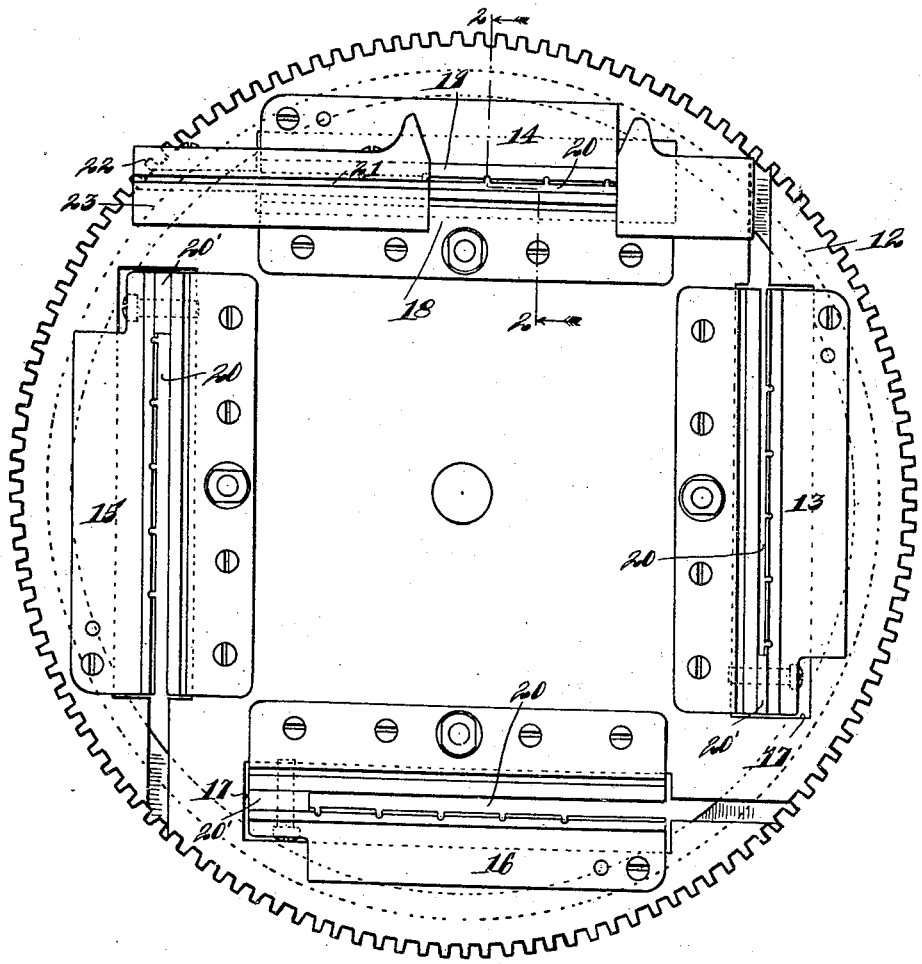

H. PETERSEN.
MOLDING MECHANISM FOR LINOTYPE MACHINES.
APPLICATION FILED MAY 10, 1917.

1,245,265.

Patented Nov. 6, 1917.
2 SHEETS—SHEET 1.

H. PETERSEN.
MOLDING MECHANISM FOR LINOTYPE MACHINES.
APPLICATION FILED MAY 10, 1917.
1,245,265.
Patented Nov. 6, 1917.
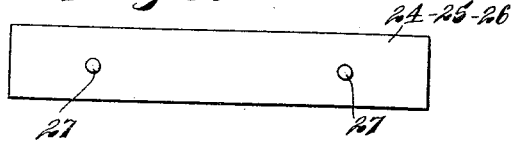
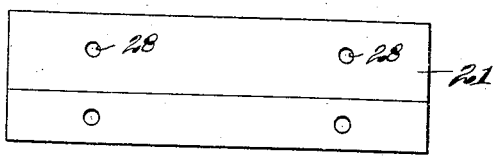
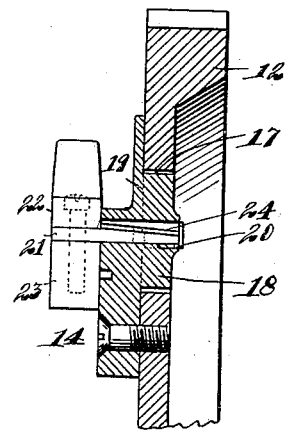
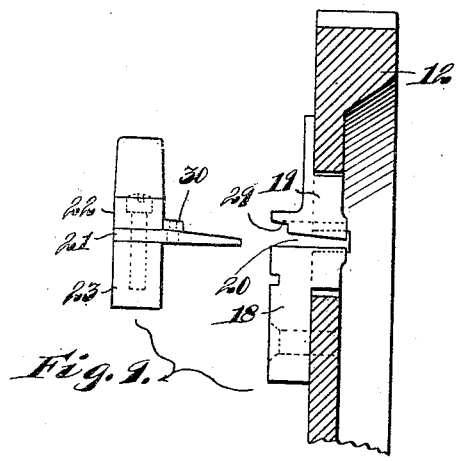

UNITED STATES PATENT OFFICE.

HANS PETERSEN, OF DAVENPORT, IOWA, ASSIGNOR TO THE LINOGRAPH COMPANY, OF DAVENPORT, IOWA, A CORPORATION OF MAINE.

MOLDING MECHANISM FOR LINOTYPE-MACHINES.

1,245,265.  Specification of Letters Patent.  Patented Nov. 6, 1917.

Application filed May 10, 1917. Serial No. 167,815.

*To all whom it may concern:*

Be it known that I, HANS PETERSEN, a citizen of the United States, and a resident of the city of Davenport, county of Scott, and State of Iowa, have invented certain new and useful Improvements in Molding Mechanism for Linotype-Machines, of which the following is a specification.

My invention relates to improvements in molding mechanism for linotype machines, this application involving a further extension of the principle involved in my pending application, Serial No. 126,765.

In the operation of linotype machines, it is desirable to cast slugs of a wide variety of sizes or widths to meet various conditions, and heretofore whenever it has been desired to change the width of the slug produced on a linotype machine, it has been necessary for the operator of the machine to substitute liners of sizes different both in width and length from those previously used in order to make the mold cavity of a size to produce the desired slug. To make these changes requires considerable time on the part of the operator, and in order to allow for the changes being made at all, it requires a great variety of equipment which must be kept on hand to meet the conditions encountered by the printer.

It is the object of my invention to provide a molding mechanism for linotype machines which will permit of the production of slugs of various sizes through but very slight adjustment in the machine, requiring but a moment's time on the part of the operator; a further object being the production of a mechanism as mentioned in which but few parts are employed in effecting adjustment of the machine to produce different size slugs and in which, therefore, the necessity of keeping on hand a great variety of equipment, as is necessary at the present time, will be obviated.

A still further object is the production of a molding mechanism as mentioned which will be of durable and economical construction and highly efficient in use. Other objects will appear hereinafter.

With these objects in view, the invention consists in the combinations and arrangements of parts hereinafter described and claimed.

The invention will be best understood by reference to the accompanying drawings forming a part of this specification, and in which, Figure 1 is a front elevation of a mold wheel of a linotype machine, embodying the invention, Fig. 2, a slightly enlarged detail section taken on line substantially 2—2 of Fig. 1, Fig. 3, a section of the movable vise jaw of the machine carrying the liner embodying the invention, Fig. 4, a plan view of the liner detached, Fig. 5, a plan view of one of the liner sections or filler pieces, Figs. 6, 7, and 8 sections through liner sections or filler pieces of various thicknesses, and Fig. 9, a view similar to Fig. 2 showing the embodiment of the invention in a slightly modified form.

The preferred form of construction as illustrated in the drawings comprises the conventional mold wheel 12 of a linotype machine which, when in use, is mounted for rotary adjustment as well as transverse shifting toward and from the liner coöperating therewith, as will be hereinafter described. Carried by the mold wheel 12 is a plurality of molds 13, 14, 15 and 16, all being of the same construction except that the mold cavities therein vary in width. The wheel 12 is formed with slots or openings 17 for the accommodation of said molds, each of the latter comprising a body part 18 and a cap 19 which are suitably fastened to the wheel to form a mold cavity 20 between the same. As above mentioned, the cavities of the molds carried upon the wheel 12 vary in width, the cavity of mold 13 being of minimum width, the cavity of mold 14 being next larger, that of mold 15, next larger than that of mold 14, and the cavity of mold 16 being of greatest width. Each mold cavity is closed at one end by a closure block 20', the arrangement being such as will be seen, that each mold will be closed at three sides, the remaining fourth side being open.

The liner 21 which is arranged for coöperation with the molds of mold wheel 12 is secured in the usual manner between the parts 22 and 23 of the movable vise jaw of the machine, the arrangement being such that said liner is adapted for reception in any of the mold cavities, engagement of the same with any one of the mold cavities being effected by shifting of the mold wheel toward the liner as will be readily understood by those skilled in the art. In order to effect engagement of the liner with the cavity of any of the other molds on the wheel, it is only necessary to rotate the latter so as to bring the desired mold to the position for registration with the liner.

The liner is of a size to adapt the same for reception in the mold cavity of smallest size, namely the cavity of mold 13 which cavity said liner is adapted to snugly fit. The cavity is of rearwardly tapering form and the liner is correspondingly tapered in order to allow for ready insertion of the liner as will be readily understood. Also one side of the mold cavity is grooved as seen, the advantages of this tapering and grooved construction being set forth and covered in my copending application, Serial No. 126,765, above referred to. The liner serves the function of closing the open or fourth side of the mold cavity, and adjustment in the length of the mold cavity and hence the slug formed, is effected by simply adjusting the movable vise jaw longitudinally of the mold.

In order to produce a slug of greater width than that produced by the mold 13, it is only necessary to adjust the mold wheel to bring into registration one of the other molds in which the mold cavity is of a size to produce the larger slug desired. Where one of the other larger molds is brought into play however, it will be seen that the liner 21 will not be of requisite width to fit the mold, being too small. In order to adapt the liner to fit the larger mold cavities, a plurality of liner sections or filler members 24, 25 and 26 are provided each of which is adapted for application to the liner, as seen in Fig. 3. Each of said members 24, 25 and 26 is provided with a pair of studs or pins 27 adapted for frictional engagement with openings 28 provided for the reception thereof in liner 21. The members 24, 25 and 26 are of various thicknesses, the member 24 being adapted for use where the mold 14 is employed, the liner, when provided with the member 24 being adapted to snugly fit the cavity of mold 14 as seen in Figs. 2 and 3. Likewise the member 25 is adapted for use when the mold 15 is employed, and the member 26, which is of greatest thickness, is adapted for employment where the mold 16 is brought into play. Thus, it will be seen that in order to adapt the liner for use in connection with the various sized mold cavities, above the minimum size, it is only necessary to provide the liner with a filler member or liner section of requisite size to increase the width of the liner to the desired extent. Such application to the mold liner may be effected by the operator with ease and expedition without the necessity of the operator leaving his seat. Also the adjustment of the mold wheel to bring into play the mold of the size desired may be effected with corresponding ease and expedition.

In the form shown in Fig. 9, I have shown the principle of the invention applied to a so-called recessed mold, that is a mold in which a recess 29 is provided at the front end of the mold cavity for producing a character carrying web or enlargement at the outer side of the slug. Where the invention is used in connection with such an arrangement, a plurality of sections or filler members 30 will be provided for use in connection with the liner in order to adapt the same for use in connection with recesses of various widths which may be formed in the plurality of molds employed, in precisely the same manner as before described in connection with the sections or filler members 24, 25 and 26.

While I have illustrated and described the preferred forms of construction for carrying my invention into effect these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a linotype machine, the combination of a plurality of slug molds of different dimensions; and a liner arranged for coöperation with said molds and adapted for adjustment to various sizes to fit any of said molds, substantially as described.

2. In a linotype machine, the combination of a plurality of slug molds of various widths; a liner arranged for coöperation with said molds; and means for varying the effective width of said liner to adapt the same to fit any of said molds, substantially as described.

3. In a linotype machine, the combination of a plurality of slug molds of various widths; a liner arranged for coöperation with said molds; and means adapted for detachable mounting on the body of said liner for varying the effective width thereof to adapt the same to fit any of said molds, substantially as described.

4. In a linotype machine, the combination of a plurality of slug molds of various widths; a liner arranged for coöperation with said molds; and a plurality of interchangeable members of various thicknesses adapted for detachable application to the body of said liner for varying the effective width thereof to adapt the same to fit any of said molds, substantially as described.

5. In a linotype machine, the combination of a plurality of slug molds of different dimensions; and a sectional liner arranged for coöperation with said molds and adapted for adjustment to various sizes to fit any of said molds, substantially as described.

6. In a linotype machine, the combination of a plurality of slug molds of different widths; an adjustable vise jaw; a liner carried by said vise jaw for coöperation with said molds; and means for varying the effective width of said liner to adapt the same to fit any of said molds, substantially as described.

7. In a linotype machine, the combination of a plurality of slug molds of various widths tapering from front to rear; a liner of corresponding tapering form arranged for coöperation with said molds; and means for varying the effective width of said liner to adapt the same to fit any of said molds, substantially as described.

8. In a linotype machine and in combination with two or more molds of various widths for same, the adjustable vise jaw adapted to carry a series of interchangeable liners of variable thickness to coöperate with the molds.

9. The adjustable vise jaw adapted to carry a series of interchangeable liners of variable thickness, tapered from front to rear, in combination with a series of molds having a similarly tapered opening to coöperate with the liners.

10. A series of molds with molding cavity of different dimensions, tapered in the direction of movement of the mold, in combination with a vise jaw, a series of similarly tapered interchangeable liners carried by the vise jaw, and coöperating with the mold to close one side of the molding cavity when the mold moves forward to casting position.

11. A series of molds with molding cavity of different dimensions, tapered in the direction of movement of the mold, in combination with a vise jaw, a similarly tapered liner carried by the vise jaw, and a series of filling pieces interchangeably attachable to the liner.

In testimony whereof I have signed my name to this specification in the presence of two subscribing witnesses.

HANS PETERSEN.

Witnesses:
M. HELEN KELLEY,
C. R. DAHLHEIM.